(12) United States Patent
Koch et al.

(10) Patent No.: US 9,697,398 B2
(45) Date of Patent: Jul. 4, 2017

(54) METHODS, SYSTEMS, AND PRODUCTS FOR TRACKING OBJECTS

(71) Applicant: AT&T Intellectual Property I, L.P., Atlanta, GA (US)

(72) Inventors: Robert A. Koch, Norcross, GA (US); Barrett Kreiner, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 110 days.

(21) Appl. No.: 14/334,721

(22) Filed: Jul. 18, 2014

(65) Prior Publication Data

US 2015/0015370 A1    Jan. 15, 2015

Related U.S. Application Data

(63) Continuation of application No. 12/202,517, filed on Sep. 2, 2008, now Pat. No. 8,896,422, which is a
(Continued)

(51) Int. Cl.
*G06K 7/10* (2006.01)
*H04M 1/725* (2006.01)
(Continued)

(52) U.S. Cl.
CPC ......... *G06K 7/10386* (2013.01); *G06Q 10/08* (2013.01); *G06Q 10/087* (2013.01); *G06Q 30/02* (2013.01); *G06Q 30/0207* (2013.01); *G06Q 30/06* (2013.01); *G08B 21/0275* (2013.01); *G08B 21/24* (2013.01); *H04M 1/7253* (2013.01)

(58) Field of Classification Search
CPC .. G06K 7/10386; G06Q 10/08; G06Q 10/087; G06Q 30/02; G06Q 30/0207; G06Q 30/06; G08B 21/0275; G08B 21/24; H04M 1/7253
USPC ... 340/10.1, 10.2, 10.3, 10.31, 10.32, 10.33, 340/10.34, 10.4, 10.41, 10.42, 10.5, 340/10.51, 10.52
See application file for complete search history.

(56) References Cited

U.S. PATENT DOCUMENTS 3,689,885 A    9/1972    Leon et al.
3,732,465 A    5/1973    Palmer
(Continued)

FOREIGN PATENT DOCUMENTS

EP    0258415    12/1992
WO    WO 8704900    8/1987
WO    WO 01/99066    12/2001

OTHER PUBLICATIONS

US to Weigh Computer Chip Implant, Story at Netscape, Feb. 27, 2002, 4pp.
(Continued)

*Primary Examiner* — Yong Hang Jiang
(74) *Attorney, Agent, or Firm* — Scott P. Zimmerman, PLLC

(57) ABSTRACT

Tags are used to recover lost objects. Each tag transmits identification information to passing communications devices, such as a cellular phone. The cellular phone then uploads the tag's identification information, along with a location, to a central network database. The central network database thus stores a central repository identifying locations associated with tags discovered by passing communications devices.

20 Claims, 9 Drawing Sheets

Related U.S. Application Data continuation of application No. 11/903,808, filed on Sep. 25, 2007, now Pat. No. 7,420,470, which is a continuation of application No. 11/122,342, filed on May 5, 2005, now Pat. No. 7,274,295, which is a continuation of application No. 10/283,099, filed on Oct. 30, 2002, now Pat. No. 6,900,731.

(51) Int. Cl.
*G06Q 10/08* (2012.01)
*G06Q 30/02* (2012.01)
*G06Q 30/06* (2012.01)
*G08B 21/02* (2006.01)
*G08B 21/24* (2006.01)

(56) References Cited

U.S. PATENT DOCUMENTS

| | | | |
|---|---|---|---|
| 3,752,960 A | 8/1973 | Walton | |
| 3,859,624 A | 1/1975 | Kriofsky et al. | |
| 4,262,632 A | 4/1981 | Hanton et al. | |
| 4,361,153 A | 11/1982 | Slocum et al. | |
| 4,532,932 A | 8/1985 | Batty, Jr. | |
| 5,012,236 A | 4/1991 | Troyk et al. | |
| 5,363,425 A | 11/1994 | Mufti et al. | |
| 5,511,111 A | 4/1996 | Serbetcioglu et al. | |
| 5,537,126 A | 7/1996 | Kayser et al. | |
| 5,742,237 A | 4/1998 | Bledsoe | |
| 5,796,806 A | 8/1998 | Birckbichler | |
| 5,914,675 A | 6/1999 | Tognazzini | |
| 5,923,300 A | 7/1999 | Mejia et al. | |
| 5,951,399 A | 9/1999 | Burrell et al. | |
| 5,952,935 A | 9/1999 | Mejia | |
| 6,067,529 A | 5/2000 | Ray | |
| 6,094,676 A | 7/2000 | Gray et al. | |
| 6,095,915 A | 8/2000 | Geissler et al. | |
| 6,184,777 B1 | 2/2001 | Mejia | |
| D440,505 S | 4/2001 | Laverick | |
| 6,219,710 B1 | 4/2001 | Gray et al. | |
| 6,250,557 B1 | 6/2001 | Forslund | |
| 6,292,668 B1 | 9/2001 | Alanara et al. | |
| 6,304,642 B1 | 10/2001 | Beamish et al. | |
| 6,356,802 B1 | 3/2002 | Takehara et al. | |
| 6,400,338 B1 | 6/2002 | Mejia et al. | |
| 6,404,339 B1 | 6/2002 | Eberhardt | |
| 6,424,264 B1 | 7/2002 | Giraldin et al. | |
| 6,487,540 B1 | 11/2002 | Smith | |
| 6,595,342 B1 | 7/2003 | Maritzen et al. | |
| 6,622,016 B1 | 9/2003 | Sladek et al. | |
| 6,643,516 B1 | 11/2003 | Stewart | |
| 6,686,838 B1 | 2/2004 | Rezvani et al. | |
| 6,705,522 B2 | 3/2004 | Gershman et al. | |
| 6,738,628 B1 | 5/2004 | McCall et al. | |
| 7,659,826 B2 | 2/2010 | Humbard | |
| 2001/0030625 A1 | 10/2001 | Doles et al. | |
| 2002/0054940 A1* | 5/2002 | Grose et al. | 426/231 |
| 2002/0073025 A1 | 6/2002 | Tanner | |
| 2002/0113707 A1* | 8/2002 | Grunes et al. | 340/572.1 |
| 2002/0119770 A1 | 8/2002 | Twitchell, Jr. | |
| 2002/0133424 A1 | 9/2002 | Joao | |
| 2002/0147650 A1 | 10/2002 | Kaufman et al. | |
| 2002/0169539 A1 | 11/2002 | Menard et al. | |
| 2003/0014332 A1 | 1/2003 | Gramling | |
| 2003/0052161 A1 | 3/2003 | Rakers et al. | |
| 2003/0055733 A1 | 3/2003 | Marshall | |
| 2003/0095032 A1 | 5/2003 | Hoshino et al. | |
| 2003/0097304 A1* | 5/2003 | Hunt | 705/22 |
| 2003/0120745 A1* | 6/2003 | Katagishi et al. | 709/217 |
| 2003/0200108 A1 | 10/2003 | Malone | |
| 2003/0217005 A1 | 11/2003 | Drumond | |
| 2003/0229559 A1 | 12/2003 | Panttaja et al. | |
| 2003/0235172 A1 | 12/2003 | Wood | |
| 2004/0024658 A1 | 2/2004 | Carbone et al. | |
| 2004/0029589 A1 | 2/2004 | Becker et al. | |
| 2004/0098740 A1 | 5/2004 | Maritzen | |
| 2004/0201676 A1 | 10/2004 | Needham | |
| 2004/0225613 A1 | 11/2004 | Narayanaswami | |
| 2004/0233040 A1* | 11/2004 | Lane et al. | 340/5.86 |
| 2005/0038741 A1 | 2/2005 | Bonalle et al. | |
| 2005/0093681 A1 | 5/2005 | Masclet et al. | |

OTHER PUBLICATIONS

Stephen Shankland, Digital Dog Tags: Would you wear one?, CNET News.com, Feb. 8, 2002, 2 pp.
Introduction to Audio-ID, audiocenter.org, Feb. 11, 2002, 1 pp.
Transmitting ePC Codes, audiocenter.org, Feb. 11, 2002, 1 pp.
Reinventing the Supply Chain, audiocenter.org, Feb. 11, 2002, 1 pp.
Audio ID Summary, audiocenter.org, Feb. 11, 2002, 1 pp.
GPS Integrated FRS/GMRS Radios, Garmin, Jul. 8, 2002, 2 pp.

* cited by examiner

METHODS, SYSTEMS, AND PRODUCTS FOR TRACKING OBJECTS

CROSS REFERENCE TO RELATED APPLICATIONS

This application is a continuation of U.S. patent application Ser. No. 12/202,517 filed Sep. 2, 2008 and since issued as U.S. Pat. No. 8,896,422, which is a continuation of U.S. patent application Ser. No. 11/903,808 filed Sep. 25, 2007 and since issued as U.S. Pat. No. 7,420,470, which is a continuation of U.S. patent application Ser. No. 11/122,342 filed May 5, 2005 and since issued as U.S. Pat. No. 7,274,295, which is a continuation-in-part of U.S. patent application Ser. No. 10/283,099 filed Oct. 30, 2002 and since issued as U.S. Pat. No. 6,900,731, with each document incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

According to some of the exemplary embodiments, methods and systems enable wireless tracking and locating of devices, and methods and systems for the use of these devices.

Products and methods have been proposed and developed in an attempt to facilitate locating lost or misplaced items such as remote controls for televisions and stereos, keys, and glasses. Similarly, locating and tracking technologies have been applied to packages for shipment tracking and in object theft prevention. Another example is locating people, things, and places through technologies in communications devices and positioning systems. Some of these technologies include complex optical scanning systems, magnetic coding, microwave systems having transmitters and receivers, infrared systems, line-of-sight type systems, mechanical systems requiring physical contact with the object to be sensed and mechanically coded interactive systems of keys in combination with the parts inside a lock.

These systems are used, for example, to locate a lost television remote in a room by causing the television remote to emit an audible signal that can be heard in the room. Typically, such locator systems use a reverse line of sight arrangement to locate the remote. Wireless telephone handsets that have been removed from a cradle can be located in a house by paging the handset to produce an audible signal that can be heard by the person looking for the handset. Both of these locator systems are specific to the objects being located and merely produce an audible signal to announce the location of the misplaced device. The object must be within the range of the locator, i.e. television or phone cradle, and the person looking for the device needs to be close enough to the lost device to hear the locator signal.

Object locating and tracking systems have been developed around technologies that use tags placed on the objects to be tracked and a scanner or reader to recognize the tags and to read information stored on the tags. These tags can either be active transmitting devices or passive devices. Examples of applications for these technologies include product inventory, grocery store checkouts, and package tracking. Each reader is generally a stand-alone, independent system capable of monitoring and obtaining information only on the objects that pass within its range. Generally, this range is very small, on the order of a few feet or less. In addition, the tags used in these systems are relatively expensive, making them suitable for expensive items but less suitable for inexpensive consumer items such as those purchased in a grocery store or discount store.

These types of tag and reader systems are illustrated, for example, in U.S. Pat. No. 3,859,624 that is directed to an inductively coupled transmitter and responder arrangement having a transmitter and a passive responder tag that receives all power from the AC power field inductively coupled thereto from the power field generator of the interrogator. The tag generates a code that is unique to the particular responder tag, and the code itself is generally a binary notation code. The interrogator receives the detected coded signal and generates an output signal which can be stored on magnetic tape for utilization in the computer, presented in a visual display, or transmitted elsewhere for subsequent utilization.

Similarly, U.S. Pat. No. 5,012,236 is directed to an electromagnetic energy transmission and detection apparatus which can simultaneously transmit a high intensity magnetic field and detect a localized low intensity magnetic field for greater distances between a reader and a passive identification tag. The reader includes a transmitter coil for transmitting a high intensity electromagnetic field to the passive identification tag and to receiver coils for receiving the low intensity electromagnetic field retransmitted by the passive identification tag to the reader. The passive identification tag includes a transponder which is capable of retransmitting a very low intensity electromagnetic field of a highly localized nature when exposed to an electromagnetic field transmitted by the transmitter coil of the reader.

U.S. Pat. No. 5,952,935 is directed to an improved programmable channel search reader that includes a field programmable serial port which may be linked to a computer by either hardware, radio frequency or the like to edit or enhance the software of the reader and if so programmed for external data logging and storage.

U.S. Pat. No. 6,184,777 discloses a passive integrated transponder tag interrogation system that is connected to a control unit that is connected to a computer through a data communication cable. The computer is a general purpose computer used to provide control to the unit, and the data communication cables include RS232 type DB 25 cables, EIA 485 metallic cables, and fiber optic cables. Wireless communication methodology utilizing digital or analog radio signals and infrared signals may also be deployed for the communication cable.

Applications for the use of reader and tag systems are illustrated, for example, in U.S. Pat. No. 3,732,465 that is directed to an electronic sensing and actuator system having a sensor and a key. The key includes interconnected passive electronic components including an electrical field sensitive circuit or circuits having a selected resident frequency or frequencies of a value within the range of frequencies of the oscillator and located in the sensor such that when the key is brought into a sensing zone, the energy of the variable frequency oscillator and the sensor is changed and that change is detected by the sensor. This apparatus has applications to door locks, and the key can also be attached to objects and used in a machine for purposes of counting or sorting objects carrying the key.

U.S. Pat. No. 3,752,960 is directed to a data acquisition system for electronically identifying and recognizing objects including systems for product handling, vehicle identification, locks and keys. The system is adapted to identify an object carrying an electrically passive circuit when the object is positioned within the effective coupling zone, but not necessarily touching, a sensor device of the active network. The passive object includes a passive reactive circuit adapted to resonate at a particular frequency when excited by the electromagnetic field of a sensor of the active part of the system.

U.S. Pat. No. 6,689,885 teaches an interrogator responder arrangement that is capable of handling random orientations between the interrogator and the responder for use in applications such as the tracking of guards, watchmen and executives in industrial plants wherein each person carries a small, inexpensive non-radiative passive responder. Interrogators are positioned at various fixed locations throughout the plant. In addition, this interrogator and passive responder arrangement could be used for the handling of luggage and cargo in airport terminals and freight terminals. In addition to a responder tag that is attached to each individual piece of luggage at the check-in station or at the ticket collection station at an airport terminal, a second responder tag having a code generation capability that provides the same code as the first responder, or bears a known correspondence to that one, is given to the passenger, and the passenger can insert the second tag into the baggage request station automatic handling equipment to detect the particular code on the tag and locate the passenger's luggage.

Other applications are directed to the use of tag and reader systems for the handling and tracking of livestock. U.S. Pat. No. 4,262,632 teaches an electronic livestock identification system containing a capsule or pill having an electronic transmitter which is uniquely coded to broadcast a series of electronic pulses from each animal in which it is internally implanted. An associated interrogator receiver unit, which is preferably situated externally of the animal, may be used for sensing and appropriately utilizing the electronic pulses to identify the animal. Although the capsule may include a power supply, it is preferably a passive storage element to which power may be induced from the interrogator.

International Application Number PCT/US87/00415 is directed to a syringe implantable identification transponder which is syringe implantable into an animal and provides identification of the specific animal when the transponder is interrogated. This transponder has particular application to the identification and monitoring of migratory waterfowl and other small animals such as fish.

Given the limitations and relatively high costs of these tracking and locating systems, an improved method for tracking and locating objects that is less expensive is desired. Suitable methods would permit a consumer to easily tag desired objects, to identify the importance of those objects, and to assign any necessary information related to those objects. In addition, it is desired to be able to track those objects across greater volumes of space and not to confine the locating and tracking of those items to fixed areas where scanners are located.

SUMMARY

Exemplary embodiments of this invention are directed to systems and methods for providing a more deterministic method of locating and tracking people, places, and things and methods and systems for monitoring people, places, and things. According to an exemplary embodiment, a system uses a plurality of smart monitors in combination with a plurality of passive tags that can be inductively coupled to the monitors to pass identification signals between the two. The monitors are also linked to a communication network, in particular a wireless peer-to-peer communication network, providing direct peer-to-peer communication across the network that further includes other communications devices (e.g., cellular phones, satellite phones, Voice-Over Internet Protocol (VoIP) phones, personal digital assistants (PDAs), and any communications device having a digital signal processor (DSP)). The communications network further provides access to one or more databases that contain information related to the identification tags, the object, and/or the policies for tracking the object. Therefore, multi-network coverages and capabilities are leveraged to provide for larger coverage areas to track and search for objects, to make searching quicker by communicating directly with other monitors, to allow users of the system to initiate and control searches, and/or to report tracking and/or other information about the object (and/or identification tag) to a communications device communicating with the network.

Tags are associated with objects, and the objects can be associated with a person, place, and/or thing and with one or more monitors (e.g., one or more monitors that are typically proximate to the object). In addition, rules to control the tracking and locating of objects are provided for each object and are stored in a database for reference by one or more monitors and/or by one or more communications devices. As objects that contain identification tags pass by monitors, the monitors receive signals from the identification tags and log the receipt of these signals and any information provided by the signal. Therefore, tracking of an object is accomplished by contacting one or more monitors and checking for receipt of a signal from a particular identification tag by the contacted monitors.

Alternatively, signal receipt and the information provided by the identification signal can be forwarded to and stored in the central databases accessible through the network. Any monitor having access to the network can then access the database and look for any information about an identification tag and the object to which that tag is attached, integrated, or otherwise associated (e.g., a cell phone associated with a particular person). In addition to general information about tags, objects, and monitors, the database may contain a series of policies associated with each tag. These policies include protocols to be followed to search for particular tags including parameters for determining when an object is lost, reporting requirements for lost objects, associated monitors to contact when searching for an object. These policies may further include protocols and instructions to be followed to communicate a notification message to a communications device (e.g., a personal computer system, a cellular phone, an interactive pager, a personal digital assistant (PDA), a Voice over Internet Telephony (VoIP) phone, a global positioning system (GPS), and any device having a digital signal processor (DSP) communicating with the network).

Other systems, methods, and/or computer program products according to exemplary embodiments will be or become apparent to one with skill in the art upon review of the following drawings and description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following description taken in connection with the accompanying figures, wherein.

DESCRIPTION

Exemplary embodiments of this invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, systems and methods are used to locate selected objects, such as people, places, and things. Further exemplary embodiment include systems and methods to locate and recover lost or misplaced objects, to locate objects that are stolen or otherwise misappropriated, to track important or sensitive objects that include livestock, and people, to communicate a notification message about the object (e.g., a coupon to use when purchasing the object), and/or to communicate the tracking data about the object.

Figure 1:
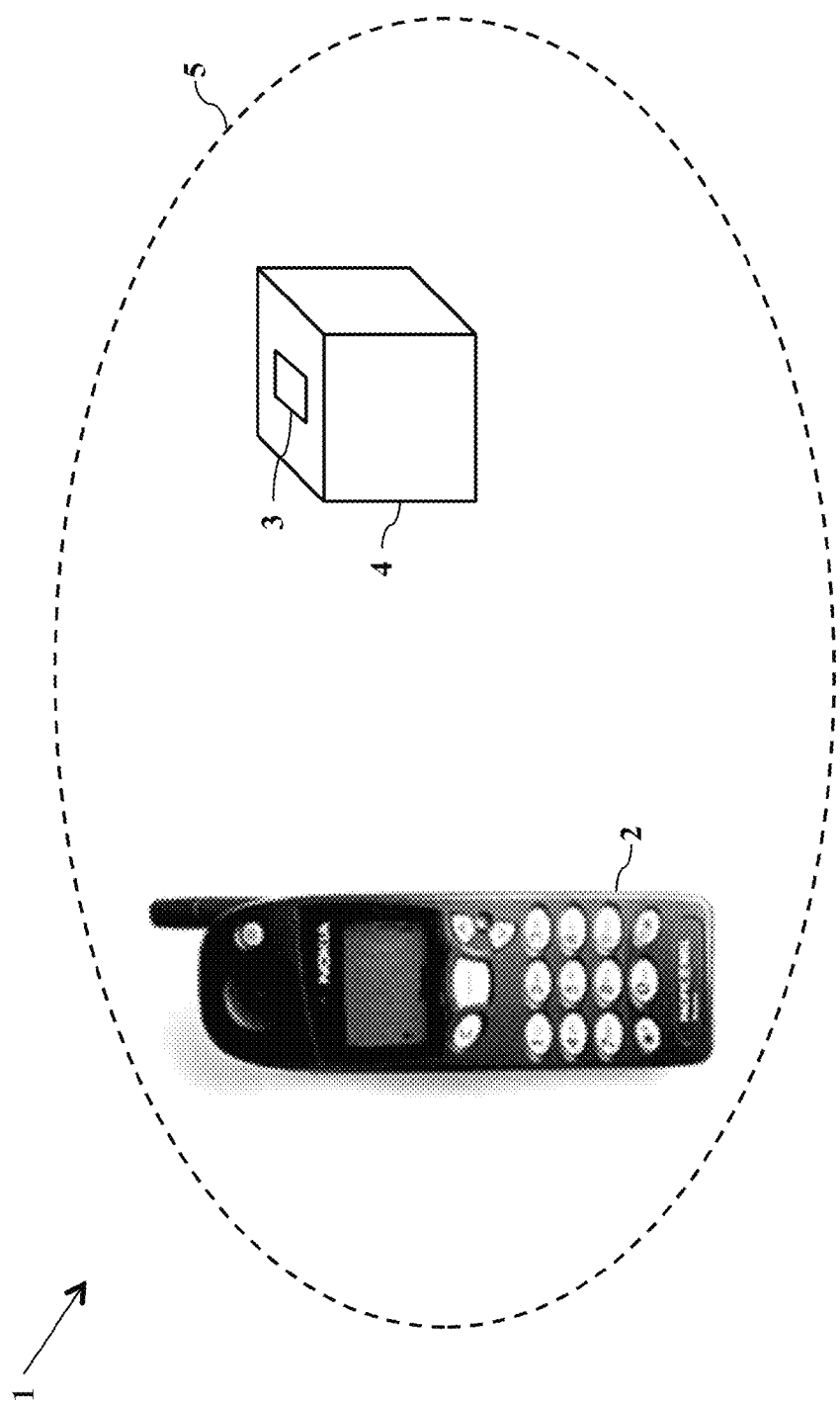
FIG. 1 is a schematic representation of an embodiment of a monitor and identification tag according to some of the exemplary embodiments.

Referring initially to FIG. 1, the object monitoring and tracking system 1, according to some of the exemplary embodiments includes at least one monitor 2 capable of receiving a transmitted signal and at least one identification tag 3 capable of generating an identification signal. The identification tag is attached to the object 4 to be monitored or tracked. The identification tag 3 transmits the generated identification signal within a transmission volume 5. The monitor 2 receives the identification signal that is emitted from the identification tag 3 while it is disposed within the transmission volume 5. Various arrangements of monitors and identification tags are readily available and known to those of skill in the art and are suitable for use in the object monitoring and tracking system according to some of the exemplary embodiments.

In general, the monitor 2 includes the electronics and circuitry necessary to receive the identification signal. This circuitry includes a receiver for receiving the identification signal, a logical processor connected to and in communication with the receiver, and a power supply electrically coupled to all of the electronic components and circuitry of the monitor to provide power thereto. Suitable frequencies for the receiver include radio frequencies, and suitable logical processors can receive and interpret the identification signal to match the signal with information stored in a database to identify the object to which the identification tag is attached.

In an exemplary embodiment, the identification tag 3 generates the identification signal in response to receipt of a signal generated and transmitted by the monitor. In this embodiment, the monitor also includes a transmitter. Suitable transmitters include radio frequency transmitters. Preferably, the object monitoring and tracking system includes a plurality of monitors that are each capable of transmitting a radio frequency signal and of receiving the identification signal transmitted by the identification tag. Each monitor may also include a memory for storing the received identification signals.

The monitors 2 are preferably incorporated into other electronic devices. Suitable electronic devices include cellular phones, wire line phones, pagers, personal digital assistants, computers, alarms or other general monitoring systems, electronic watches, stereos, televisions, video cameras, smoke alarms, cameras, radar equipment, and photocopiers. These electronic devices are selected and deployed as monitors to create both a plurality of stationary monitors and a plurality of mobile monitors. The stationary monitors are associated with a known fixed location such as a physical street address. The mobile monitors are associated with moving or non-stationary items such as a person, animal, automobile, airplane, boat, robot, satellite and combinations thereof.

Figure 2:
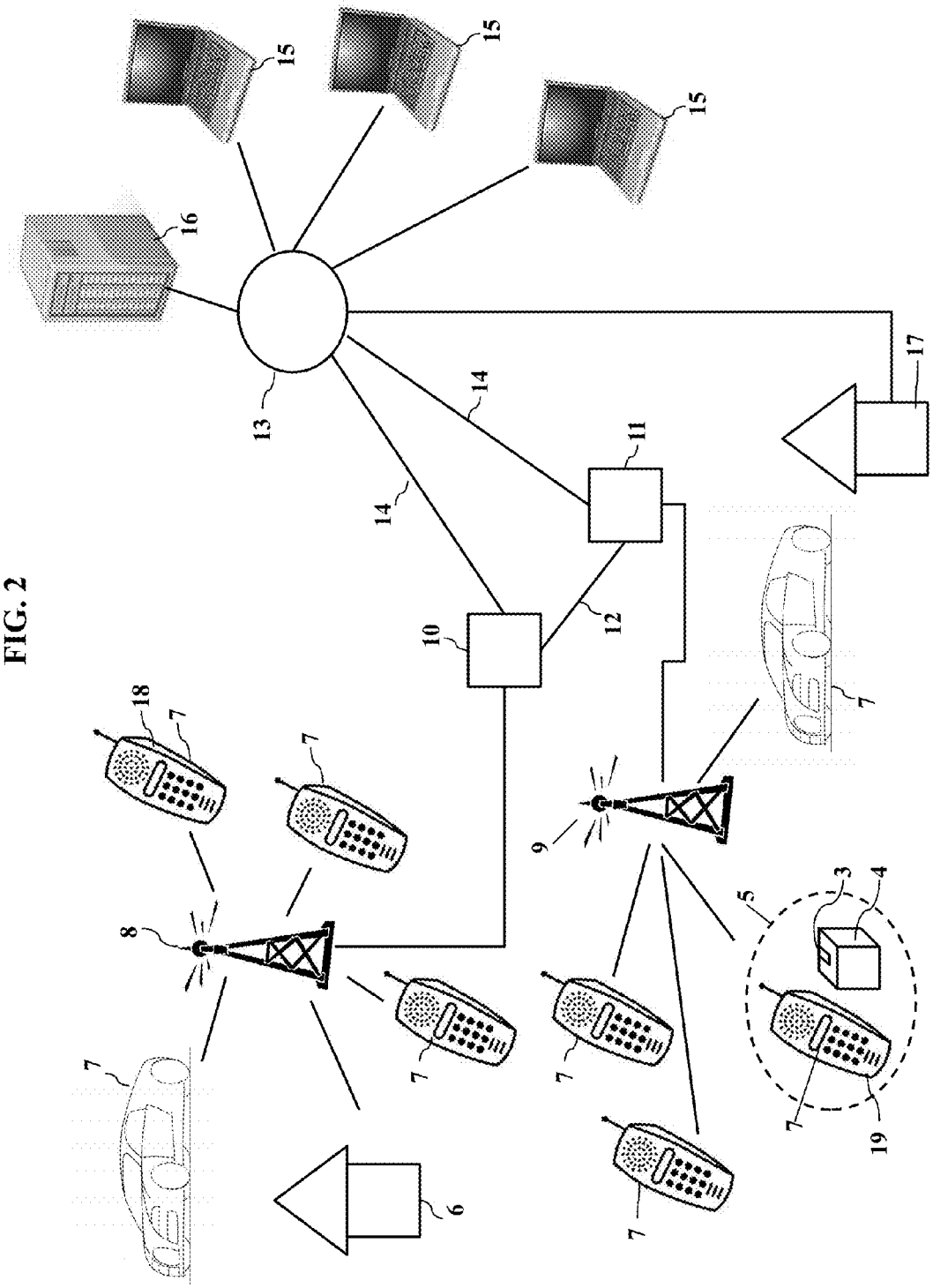
FIG. 2 is a schematic representation of an embodiment of the network tracking and monitoring system according to some of the exemplary embodiments.

As is shown in FIG. 2, in order to expand and to maximize the area or volume covered by the object monitoring and tracking system according to some of the exemplary embodiments, the monitors are in communication with at least one communications network. Preferably, the monitors are in communication with a plurality of communications networks. Any network capable of permitting communication among the monitors is suitable for use with the exemplary embodiments of this invention including wireline and wireless communications networks. In an exemplary embodiment, the communications network is a wireless type network. In another exemplary embodiment, the communications network is a peer-to-peer type network.

As illustrated, a plurality of stationary monitors 6 and a plurality of mobile monitors 7 are associated with a first wireless peer-to-peer network 8 and a second wireless peer-to-peer communications network 9 respectively. These wireless communications networks can be associated with one or more telephone networks such as an Advance Intelligent Network (AIN), Public Switched Telephone Network (PSTN), Mobile Switching Telephone Office (MSTO), and others. In an exemplary embodiment, the first wireless network 8 is associated with a first telephone network 10, and the second wireless peer-to-peer network 9 is associated with a second telephone network 11. The first and second telephone networks can be in communication through a direct data link 12. The telephone networks may be linked to one or more computer and/or data networks 13 through separate network interface data lines 14. For example, the computer and/or data network 13 may be a local area network or a wide area network, such as the Internet. All of the computer networks 13 are in communication with each other, and any monitor can communicate directly with any other monitor across these networks. In addition, the computer network 13 includes a plurality of additional computers 15, and may also include either stationary or mobile monitors 17 directly link thereto.

The object monitoring and tracking system also utilizes one or more databases 16. Although these databases 16 can be in direct communication with the wireless networks or telephone networks, the databases 16 are preferably associated with the computer network 13. The databases 16 are used to store information about the identification tags, the objects to which the identification tags are attached, and the owners of these objects. This information includes an association between a specific identification tag and the object to which that tag is attached and profile information about the registered owner of that object. Also included in this information is a description of the object (e.g., a physical description), a purchase price of the object and any applicable coupons or discounts available with the purchase of the object, a purchase date for the object and any applicable expiration dates of the coupons or discounts, a value for the object, a date of manufacture, an expiration date, a profile of a registered owner of the object, a profile of a registered user of the object, a merchant providing a service for the object, a merchant providing a product related to the object, a calendar associated with the object, or combinations thereof. Input of this information by the owner or by a user is facilitated through the computer network 13. The information can be input using any computer 15 (or alternate communications device) in communication with the network 13. Alternatively, the owner or the user may upload the information using either any stationary monitor 6 or any mobile monitor 7 that is in communication with the computer network 15.

The monitors may be passive devices that record the identification signals of any and all objects carrying identification tags that pass close enough so that the monitor falls within the transmission volume of that transmission tag. Alternatively, the monitors are actually active devices that proactively search for specific identification tags. The monitors may also include monitor identification tags that are similar to the object identification tags and that permit each monitor to track or to log the other stationary and mobile monitors over time in which it comes into contact.

According to some of the exemplary embodiments, the systems and methods of this invention leverage existing peer-to-peer communication networks, such as peer-to-peer wireless telephone networks, to create a more expansive area for tracking objects and/or for communicating information about a tracked object. In order to leverage these network capacities, each monitor provides the information that it receives to the network for storage in the database. The other monitors can then query the database regarding specific information signals. In addition, a customer (e.g., an owner or a user) can log on to the computer network and report an object missing. The network will check the database for occurrences of the associated identification tags and monitors and will conduct a systematic search for that particular object by checking with the appropriate monitors. Monitors may also contact each other directly across the peer-to-peer network. As illustrated in FIG. 2, a first monitor 18 may contact a second monitor 19 to see if a particular object 4 has been tracked by the second monitor 19. Therefore, a customer can use one monitor in the peer-to-peer network to track a particular object throughout the network using other monitors in the network directly.

The tracking information received by the monitors can be uploaded continuously to the database or can be uploaded only when a particular monitor accesses the network. In some of the embodiments, information about a tracked identification tag is communicated across the network to see if any monitors (or, alternatively a capable communications device that can operate as a monitor) are receptive to or searching for that identification signal. If no other monitors are currently looking for that tag information, then the information is directed to the database to wait for a request for that particular identification tag. According to additional embodiments, the methods and systems of this invention also make use of interspersed peer-to-peer wireless communication networks to provide increased coverage for searching and tracking within an area and/or for communicating information about the object or tracking data to a communications device.

The identification tags may be passive devices having no power supplies or internal smarts, that is the identification tags may receive energy from the monitor through methods such as inductive coupling to generate a unique identification signal. In order to facilitate inductive coupling with the monitors, each identification tag includes electronic circuitry, such as an induction coil. Suitable electronic circuits for coupling to the monitors and for emission of an identification signal upon exposure to a radio frequency signal are known in the art. Upon inductive coupling, each identification tag generates and transmits its unique identification signal within the transmission volume. The transmission volume can extend from the identification tag for distances of from less than a foot up to approximately several hundred feet. For security purposes, the identification signal may transmit a unique alpha-numeric code, a graphic field, or an alternate identifier of the tag in order to identify the object.

Figure 3:
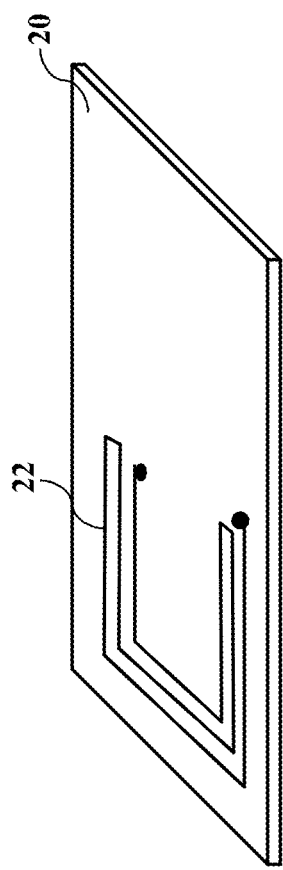
FIG. 3 is a perspective view of a first side of an identification tag according to some of the exemplary embodiments.
Figure 4:
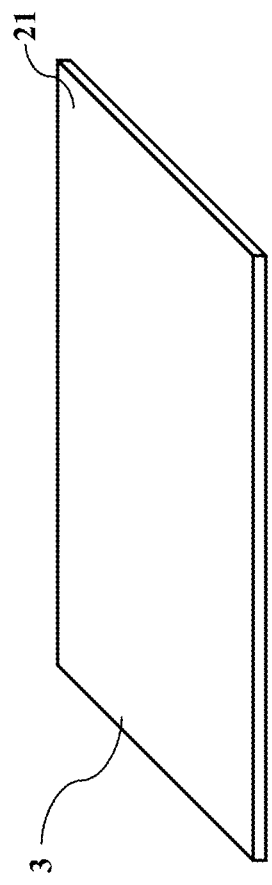
FIG. 4 is a perspective view of a second side thereof.

The identification tags are arranged to be easily attachable to objects and include fasteners or adhesives to facilitate the attachment. Suitable adhesives include glues and hook and loop type fasteners. In an exemplary embodiment, the tracking tags are removable and reattachable. The identification tags can be fashioned in any desired shape and can even be constructed to be part of the object to which they are attached. The tracking tags may be constructed to be inexpensive and easily provided so that a person may purchase multiple identification tags for placement onto the object(s) to be tracked. In the exemplary embodiments of FIGS. 3 and 4, the identification tag is made out of a sheet of material having a first side 20 and a second side 21 opposite the first side 20. The first side 20 contains the electronic circuitry capable of generating the identification signal and of transmitting that signal within the transmission volume. The electronic circuitry may be printed on the first side of the identification tag by a dot-matrix type printing process. In an exemplary embodiment, the dot-matrix type printing process may be an inkjet or laserjet type process. The second side opposite the first side contains an adhesive for attachment to the object. The first side of the identification tag, in addition to containing the electronic circuitry, may be blank or may contain printing such as a UPC, product information, advertisements or combinations thereof. Alternatively the identification tab can include camouflaging or other markings so that the identification tag will blend with the background of the object to which it is attached. According to still other exemplary embodiments, the identification tag may be integrated into the object (e.g., circuitry of the object providing a MAC address or other identifier (e.g., UPC) to be used for the tag and to associate with the object).

Figure 5:
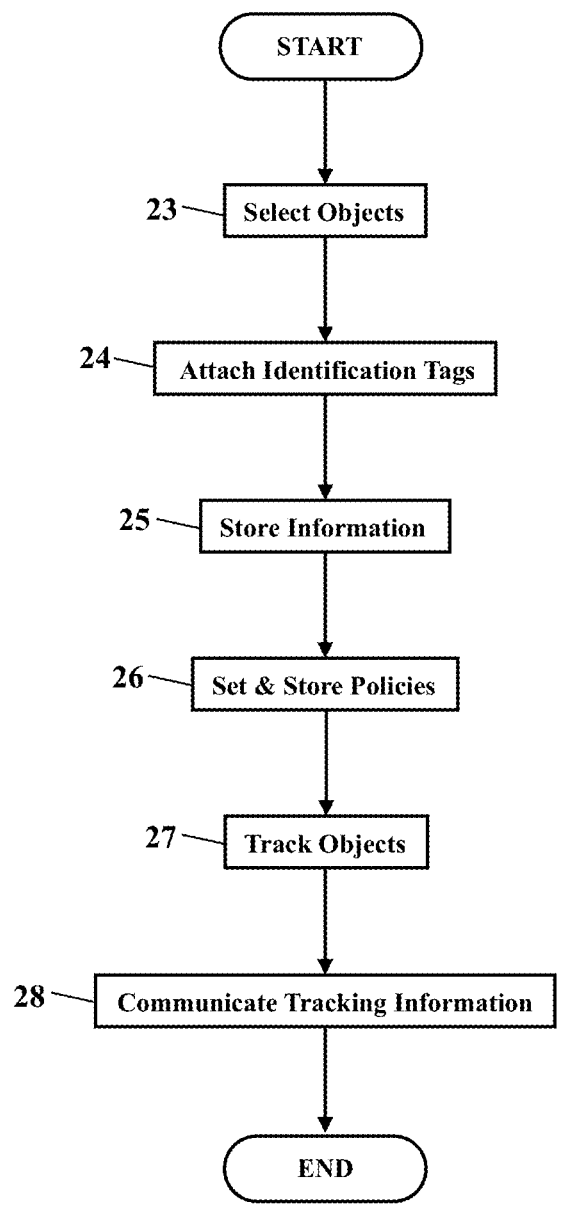
FIG. 5 is a flowchart illustrating an embodiment of the monitoring and tracking method according to some of the exemplary embodiments.

Referring to the exemplary embodiment of FIG. 5, in order to use the tracking system, an owner, or any other person having a need or desire to monitor or track an object, selects an object to be monitored or tracked 23. Alternatively, the owner (or other person) selects a plurality of objects to monitored or tracked. The owner (or other person) than places an identification tag on each selected object 24. In one embodiment, the identification tags come in pre-printed self-adhesive sheets. The identification tags are placed on the objects using the adhesive.

Since the unique identification signal transmitted by each tag is a random alpha-numeric code or alternate identifier, correspondence is needed between the identification tag and the object to which it is attached. In addition, this correspondence information may be needed by more than one monitor. Therefore, the owner (or other person) of the object, uses either a monitor (or alternate communications device) connected to the peer-to-peer network or a computer or other communications device connected to the computer network, stores the correspondence information in the database using conventional methods of network and computer interfaces and data loading 25. The owner (or other person) may also store any other information about the object in the database 25.

In addition to storing information about the object the owner, user, or other authorized person can store in the database policies regarding the rules used by the network and the monitors on the network in tracking and reporting the tracking information of each object 26. These policies include the identification of categorization of a general category into which an object is placed, for example, package, jewelry, animal, or food, and the definition of when an object bearing the identification tag is lost such as when the tag is not within the range of a particular monitor or monitors. The policies also include instructions for routine tracking of the object such as making routine communications and data transfers from specific monitors or sweeping specified volumes covered by monitors. The owner, user, or authorized person may also store instructions for reporting information about the object and tracking data of the object, such as instruction for reporting information when an object is lost, for example, by phone or e-mail to a selected communications device, and instructions on what actions to take should an item become lost. One such policy could instruct monitors to automatically look for an object if it should be determined that the object is lost. An alternative policy would notify an owner, user, and/or authorized person when an object is lost or outside a monitored area and wait for instructions before searching for the object.

In an exemplary embodiment, the policies contain protocols for searching for a lost object include where to search first, which monitors to search, and which monitors not to search. Specifically, in one example, a monitor is contacted to see if it has come into contact with the corresponding identification tag and at what time it came into contact with that tag. That monitor also provides information about other monitors with which it has been in contact. This provides for expanding or extending the tracking objects to other monitors. A continuous or real time tracking of objects is thus facilitated by contacting a succession of monitors.

Policies may be stored that place limits on the monitors that can track or otherwise communicate with an object. In an exemplary embodiment, the policies identify monitors or volumes within which an item will function or volumes and monitors within which an object will self destruct. In an embodiment for inventory and restocking, a policy can be provided to report when a particular object is out of stock or of a low amount so that restocking or purchasing of that item can take place. In another embodiment, an owner, user, or authorized person can register personal information such as allergies and the person will be notified when that person is close to an object to which the person is allergic or when the person (or other person) purchases an object that contains ingredients to which the person is allergic. In still further embodiments, the owner, user, or authorized person may store additional information, such as a profile of a registered user of the object (e.g., when the owner give a cell phone to a child to use, inputting information about the child), a merchant providing a service for the object (e.g., a service provider may input information associated service areas, pricing, competitive information, discounts available for redemption when the service is purchased or ordered, and so on), a merchant providing a product related to the object (e.g., a distributor for a product may input information associated with a store authorized to sell and market the product, coupons available for redemption when the product is purchased, and so on), and a calendar associated with the object. Any one or multiple combinations of these policies can be provided in the database for each selected object.

Once the necessary information and desired policies have been stored in the database, the objects to which the identification tags are attached are monitored or tracked 27 in accordance with the stored policies. The monitors can track the objects passively by logging a list of all the identification signals received. Alternatively, the network in accordance with a stored policy or in response to a search request from an owner or authorized person can systematically check monitors (or alternate capable communications devices) across the network for a particular object. In a peer-to-peer type network, a first monitor can contact a second monitor to check for a particular object. The identification signals received by each monitor, to further leverage the capacity of the network, are communicated to the network 28.

In some of the embodiments, each monitor continuously passes the received identification signals through the network for storage in the network accessible databases. In addition to just the signals, information about where, when, and by which monitor the signal was tracked is also stored. In an alternative exemplary embodiment, each monitor uploads the information signals every time the monitor accesses or is accessed by the network, such as when a cellular phone places or receives a call. In another exemplary embodiment, each monitor broadcasts (or otherwise communicates) the identification signals to all the other monitors, computers, and associated communications devices in the network before storing the signals in the database.

Figure 6:
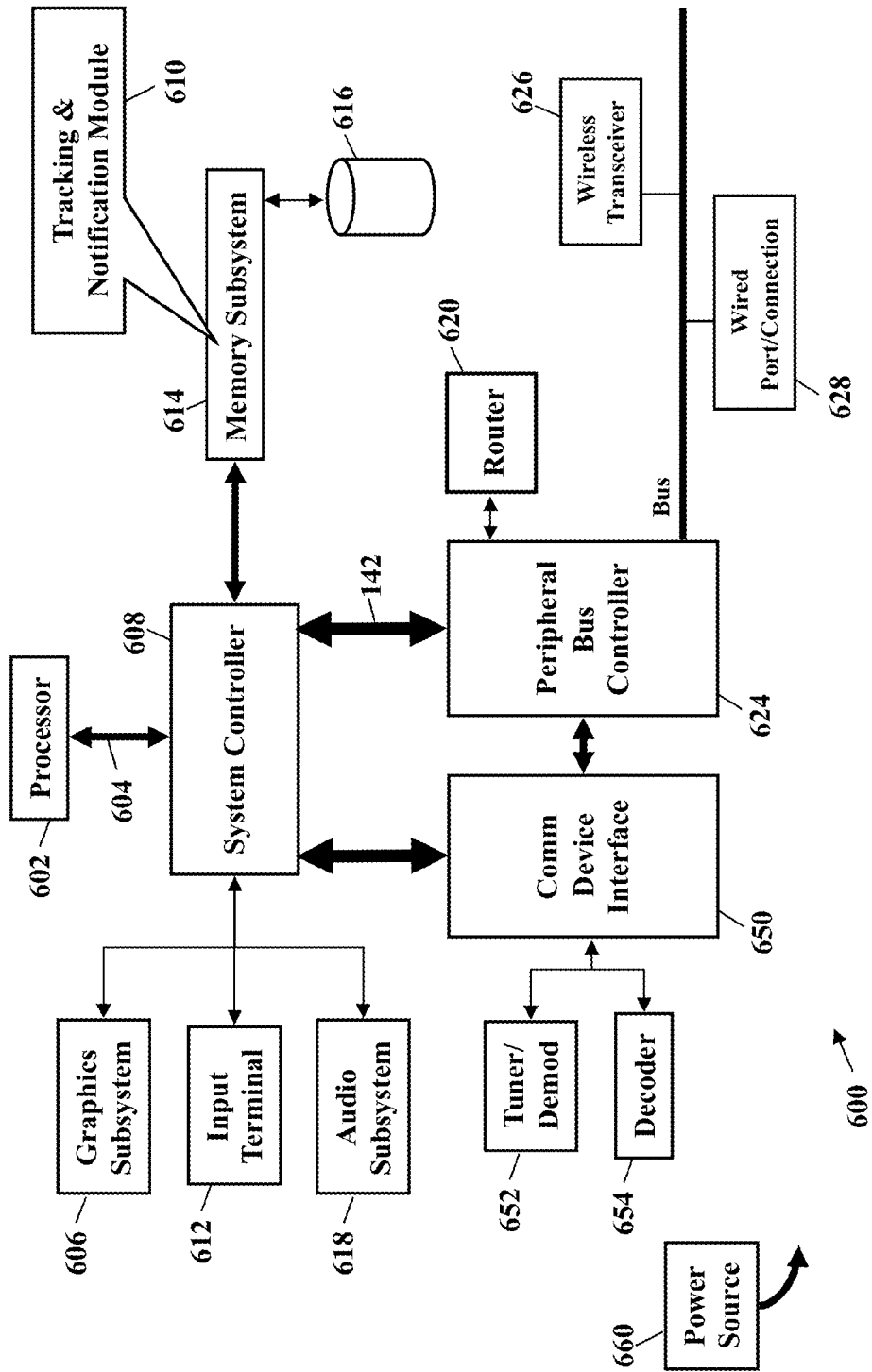
FIG. 6 illustrates a block diagram of exemplary details of a communications device having a tracking and notification module according to some of the exemplary embodiments.
Figure 9:
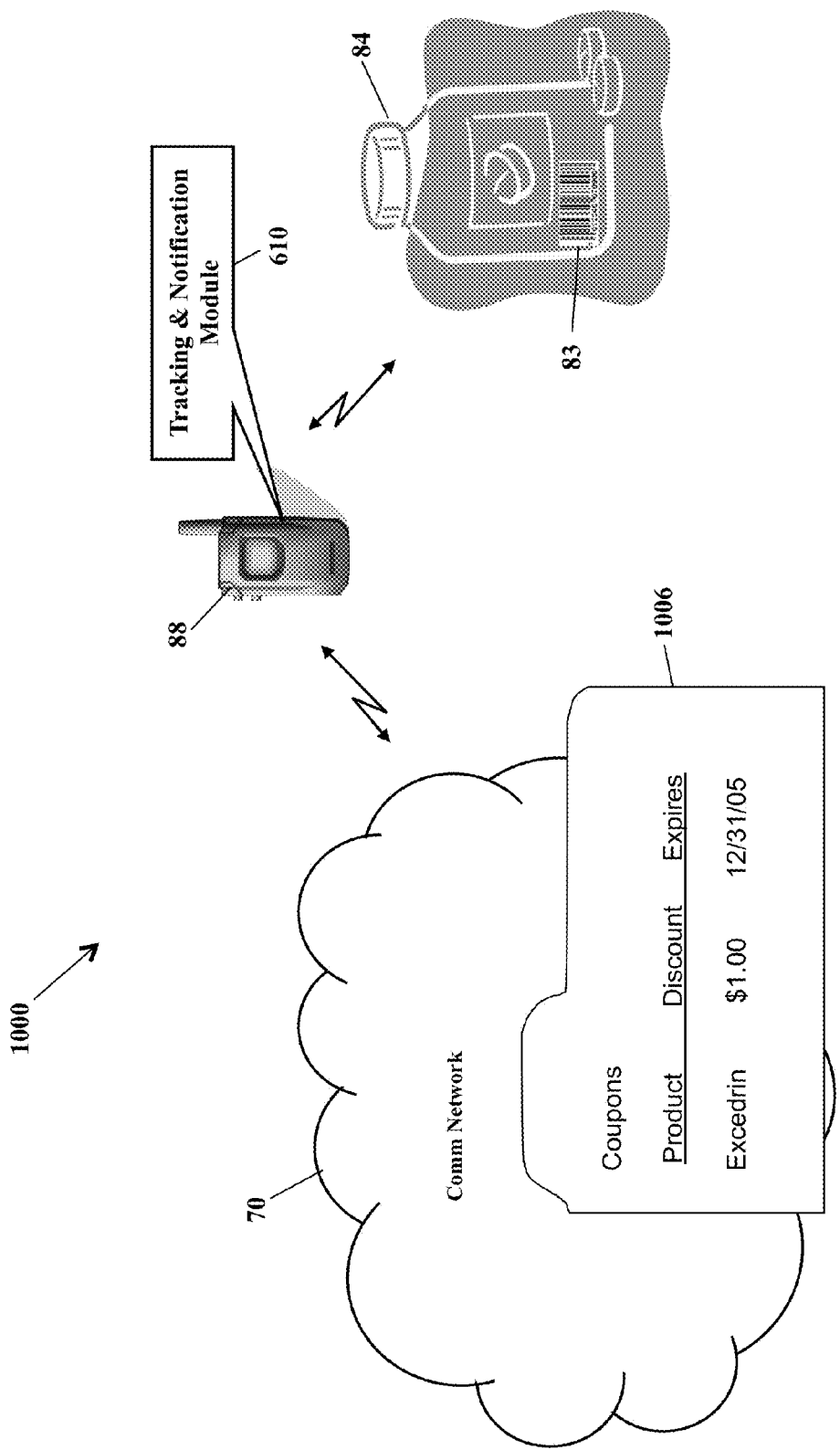
FIG. 9 depicts a more detailed schematic of the exemplary operating environment of FIG. 8.

Referring now to FIG. 6, a block diagram illustrates a Tracking & Notification Module 610 residing in a communications device 600. As FIG. 6 shows, the Tracking & Notification Module 610 operates within a system memory device. The Tracking & Notification Module 610, for example, is shown residing in a memory subsystem 614. The Tracking & Notification Module 610, however, could also reside in flash memory or a peripheral storage device 616. The communications device 600 also has one or more central processors 602 executing an operating system. The operating system, as is well known in the art, has a set of instructions that control the internal functions of the communications device 600, and furthermore has the capability to communicate a communications signal between the communications device 600 and a communications network (shown as reference numeral 70 in FIG. 7) and/or an alternate communications device (e.g., an identification tag 3 attached to an object 4 as shown in FIG. 9, such as the UPC transmitting tag 83 attached to a medicine bottle 84 shown in FIG. 10).

The system controller 608 provides a bridging function between the one or more central processors 602, a video/graphics subsystem 606, an input terminal 612, and an audio subsystem 618, the memory subsystem 614, a PCI (Peripheral Controller Interface) bus, and a Communications ("Comm") Device Interface 650. The PCI bus is controlled by a Peripheral Bus Controller 624. The Peripheral Bus Controller 624 (typically called a "Southbridge") is an integrated circuit that serves as an input/output hub for various peripheral ports and/or transceivers. The Peripheral Bus Controller 624 allows for communications with connected devices and/or the communications network. The peripheral ports allow the communications device 600 to communicate with a variety of devices (alternate input terminals) through networking ports (such as SCSI or Ethernet, not shown) and/or transceivers that include Wireless Communications ("Comm") Device Transceiver 626 (for communication of any frequency signal in the electromagnetic spectrum, such as, for example, the 802 family of standards and Infrared) and Wired Communications ("Comm") Device Port/Connection 624 (such as modem V90+ and compact flash slots). These peripheral ports could also include other networking ports, such as, a serial port (not shown) and/or a parallel port (not shown). The Peripheral Bus Controller 624 may further control communications with the input terminal 612. Additionally, those of ordinary skill in the art understand that the program, processes, methods, and systems described in this patent are not limited to any particular computer system or computer hardware.

Those of ordinary skill in the art also understand the central processor 602 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular central processor of a manufacturer.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems may include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

According to an embodiment, the system memory device (shown as memory subsystem 614 and/or peripheral storage device 616) contains the Tracking & Notification Module 610 that cooperates with the operating system and with other input/output devices (e.g., the graphics subsystem 606, the input terminal 612, and/or the audio subsystem 618) to provide a graphical user interface (GUI). The graphical user interface provides a convenient visual and/or audible interface with the communications device 600. For example, the Tracking & Notification Module 610 may provide a GUI that enables the user to access, modify, create, and/or otherwise manage information about the object to be tracked.

Figure 7:
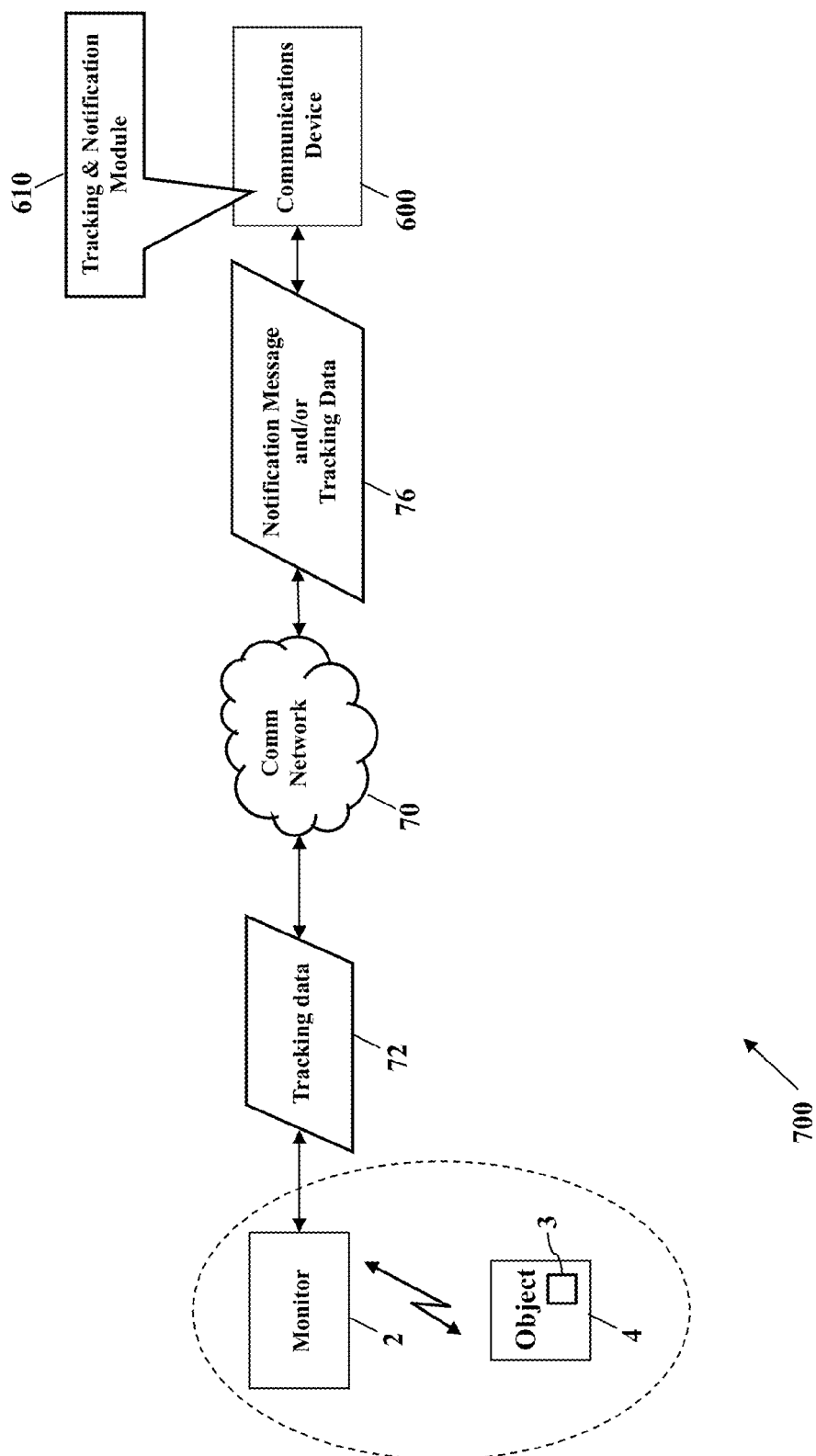
FIG. 7 is a simplified schematic of an operating environment according to some of the exemplary embodiments.
Figure 8:
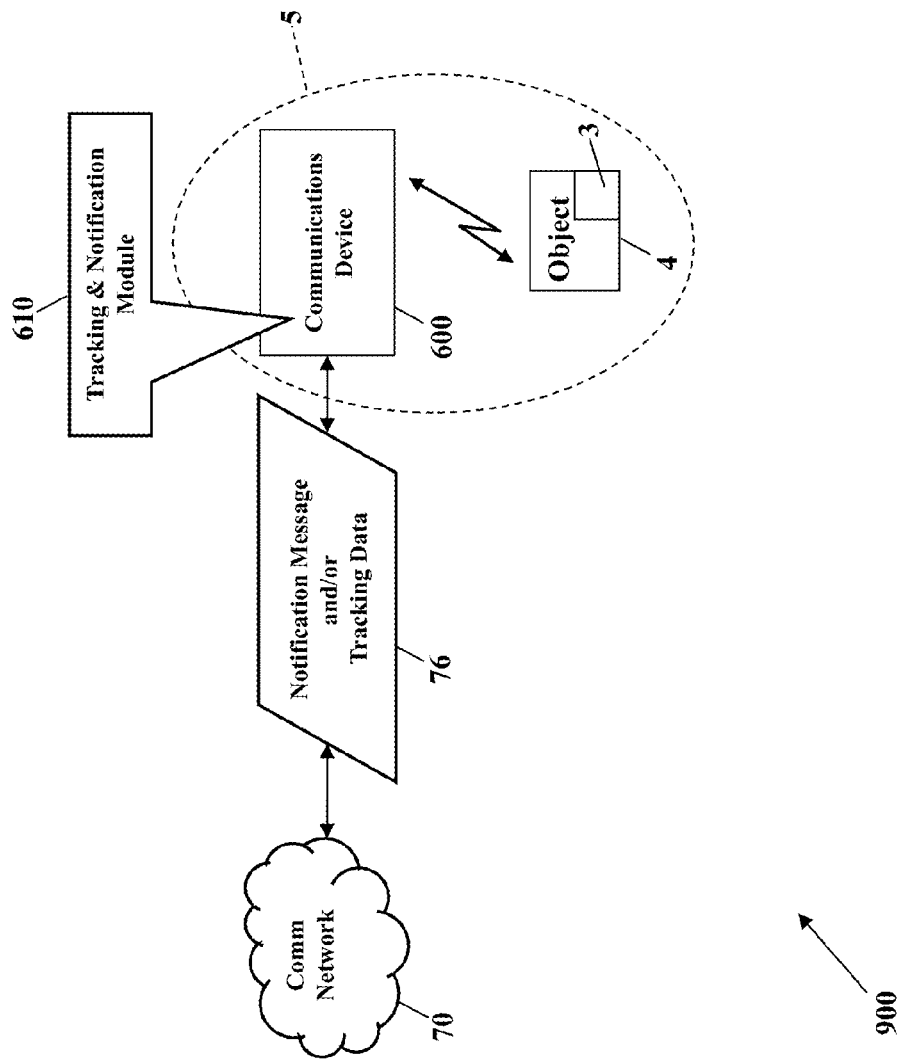
FIG. 8 illustrates another simplified schematic of another exemplary operating environment according to some of the exemplary embodiments.

As shown in FIG. 7, a tracking and notification operating environment 700 includes the monitor 2, the object 4 with the attached or otherwise integrated tag 4, tracking data 72, a communications network 70, a notification message and/or tracking data 76, and the communications device 600 having the Tracking & Notification Module 610. As earlier described, the monitor 2 communicates tracking data 72 with the communications network 70. For example, the communications network 72 may communicate instructions to the monitor 2 to search for the object 4 with the tag 3. The monitor 2 then transmits a signal within a selected transmission volume to search for the object 4 having the tag 3. If the tag is disposed within the transmission volume, then the tag returns an identification signal to the monitor 2 and the monitor 2 communicates the tracking information to the communications network 72. Communications protocols or policies may then instruct the communications network 70 to send the notification message and/or tracking data 76 to the communications device 600. For example, a medicine bottle has an identification tag affixed to the bottle. The identification tag is camouflaged as the UPC symbol on the medicine bottle. An in-store, a checkout monitor receives the identification signal from the tag and communicates with the communications network 70. The communications network 70 then retrieves an available coupon of $1 off and communicates the coupon to a point of sale terminal at the checkout counter to redeem the coupon with the purchase. Thereafter, the point of sale terminal may communicate the availability of the coupon to a user's communications device shown as cellular phone. The user may select to redeem the coupon with the purchase and communicate authorization to redeem the coupon back to the point of sale terminal. According to further embodiments, the coupon may remain in the memory of the cell phone and may be redeemed for future purchases of the same medicine or for other products provided by the manufacturer or distributor of the medicine.

Figure 10:
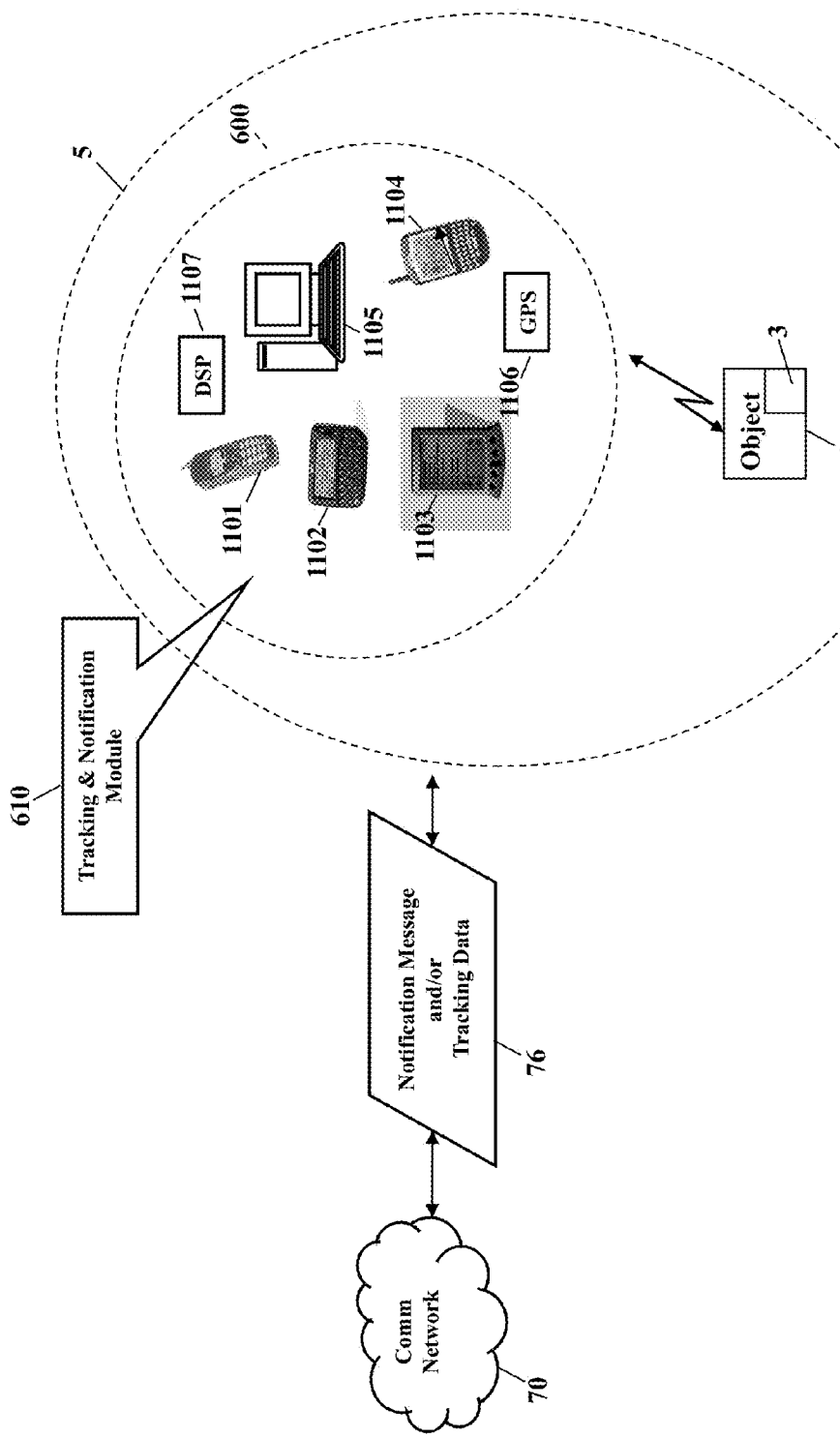
FIG. 10 illustrates the exemplary operating environment of FIG. 8 with alternative communications devices.

As shown in FIG. 9, a tracking and notification operating environment 900 includes the communications network 70, the notification message and/or tracking data 76, the communications device 600 having the Tracking & Notification Module 610, and the object 4 with the tag 3. The communications device 600 operates similar to the monitor 2 described in FIG. 7 to receive the identification signal from the tag 3 attached to the object 4. FIG. 10 illustrates an exemplary embodiment of using the operating environment 900 of FIG. 9. According to FIG. 9, the user's cellular phone 88 acts as a monitor to transmit a search signal within a transmission volume and/or to receive the identification signal from the tag 83 within the transmission volume. Thereafter, the cellular phone 88 communicates the identification signal with the communications network 70. The communications network 70 then retrieves the available coupon of $1 off 86 and communicates the coupon to the cellular phone 88. Thereafter, the user of the cellular phone may select to redeem the coupon with the purchase and communicate authorization to redeem the coupon to a point of sale terminal or may store the coupon to redeem later (such as by uploading coupons to a website to retrieve a credit to a financial account).

FIG. 11 illustrates another tracking and notification operating environment 1100 similar to the tracking and notification operating environment of FIG. 9. However, the operating environment 1100 of FIG. 11 illustrates communications devices 600 that include a wide range of alternative communications devices including a cellular phone 1101, an interactive pager 1102, a personal digital assistant (PDA) 1103, a Voice over Internet Telephony (VoIP) phone 1104, a computer system 1105, a global positioning system (GPS) 1106, and any device having a digital signal processor (DSP) 1107. Still further, the communications device 600 may include a watch, a radio, vehicle electronics, a clock, a printer, a gateway, and/or another apparatus and system. And, because the communications device 600 may have limited capabilities, the communications device 600 may only receive a portion of the notification message and/or tracking data 76 from the communications network 70. The Tracking & Notification Module 610 of the communications device 600 enables a user to access, create, modify, and/or otherwise manage information about the object, tracking information, and communications with the object 4 via the communications network 70.

Examples for applications of the system and method according to some of the exemplary embodiments include applying identification tags to personal property, in particular, personal property that is regularly lost including keys, glasses, pagers, watches, cameras, video cameras, credit cards, and other items. Another application includes tracking packages by a shipping company. The low cost and ease of use of the system also permit the customer or authorized user to track mail by applying to envelopes and packages stamps that have the electronic circuitry printed on them. This provides a relatively inexpensive and easy way to track a letter sent, for example, through the United States Postal Service that was previously extremely difficult to impossible to track. Monitors could be provided in mailboxes and throughout the postal distribution system. This also could be particularly useful as an anti-terrorist mechanism providing greater tracking of mail for the purposes of identifying the source of a package containing bombs or other hazardous materials.

Another exemplary application includes maintaining and monitoring files in an office. Similarly, the method and system according to some of the exemplary embodiments can be used to maintain and monitor library books within a library and throughout the borrowing area. The method and system according to some of the exemplary embodiments can also be used to monitor a person, such as a prison inmate within a prison population, on work-release or on home detention. Other exemplary embodiments of this invention provide for the tracking of wild animals, farm animals, and zoo animals. With respect to the monitoring of animals, the method and system according to some of the exemplary embodiments could be combined with a tranquilizer dosing system so that if the animal is not within a prescribed area, the tranquilizers are dosed into the system of the animal and the animal can be subdued.

The method and system according to some of the exemplary embodiments could be used to tag items in a house for insurance purposes in the case of theft or fire, providing the benefit of lowering insurance rates and managing assets by permitting the owner of tagged property to easily check to see if current insurance rates will cover current value of all the goods in the house. The method and system according to some of the exemplary embodiments can also be used to tag items to prevent theft out of a rental property or hotel and also to track any property that has been taken from those properties.

The method and system according to some of the exemplary embodiments can be used to provide for the activation or deactivation of an object. For example, a policy can be stored that provides that an object will only function when it is in proximity to a specific monitor. The method and system according to some of the exemplary embodiments can be used in an amusement park, a museum, a ballpark or stadium. In this application tags are sold to visitors as they enter the facility, and the visitor places the identification tags on important items such as cameras and video recorders. The identification tags can also be fashioned as armbands to be placed on all the family members, in particular the children. The visitors could provide the information and policies that are uploaded, specifically to a database attached to a local area network for the facility. Fixed monitors are provided throughout the facility. In addition, wireless devices that the parties carry with them can be incorporated in as mobile monitors. The facility can also have maps so that if a party stands close to the map, the location of all the other persons and property associated with that party will show up on the map to provide an easy and quick way of locating family members and property that may become dispersed throughout the facility during the course of a day. The method and system according to some of the exemplary embodiments could also be used to monitor and track family members at home, in particular school aged children, so that a parent can be notified when a child leaves the house, leaves the yard, leaves school, leaves a friends yard, enters a pool deck or arrives home from school.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

The invention claimed is:

1. A method, comprising:
receiving, at a server, tag identifiers reported by cellular mobile devices, each one of the tag identifiers associated with a different tag;
storing, by the server, the tag identifiers in a network accessible electronic database, the network accessible electronic database storing electronic database associations between the tag identifiers and global positioning system information describing locations reported by the cellular mobile devices;
receiving, by the server, a search request specifying a tag identifier of the tag identifiers;
querying, by the server, the network accessible electronic database for the tag identifier specified in the search request;
determining, by the server, that the network accessible electronic database lacks an entry that electronically associates the tag identifier specified in the search request to the global positioning system information;
retrieving, by the server, a search policy in response to the network accessible electronic database lacking the entry that electronically associates the tag identifier to the global positioning system information, the search policy defining cellular identifiers for use when searching for the tag identifier;
sending, by the server, search instructions to the cellular identifiers defined by the search policy, the search instructions instructing corresponding ones of the cellular mobile devices associated with the cellular identifiers to broadcast an interrogation signal specifying the tag identifier specified in the search request;
receiving, by the server, a response to the search instructions, the response sent from a cellular identifier of the cellular identifiers defined by the search policy, the response confirming reception of a signal sent from a tag associated with the tag identifier, and the response reporting the global positioning system information reported as a location associated with the cellular identifier;
adding, by the server, the entry to the network accessible electronic database, the entry electronically associating the global positioning system information reported by the response to the cellular identifier and to the tag identifier; and
sending, by the server, the global positioning system information as a search response to the search request specifying the tag identifier;
wherein the network accessible electronic database stores a centralized repository for the locations reported by the cellular mobile devices.

2. The method of claim 1, further comprising associating the tag identifier with a time associated with the response.

3. The method of claim 1, further comprising time stamping the global positioning system information reported by the response.

4. The method of claim 1, further comprising associating the tag identifier with a profile.

5. The method of claim 1, further comprising associating the tag identifier to a description of an object.

6. The method of claim 1, further comprising retrieving the global positioning system information associated with any of the cellular identifiers defined by the search policy.

7. The method of claim 1, further comprising:
querying the network accessible electronic database for a description of an object; and
retrieving the global positioning system information having one of the electronic database associations with the description of the object.

8. A system, comprising:
a processor; and
a memory device, the memory device storing code, the code when executed causing the processor to perform operations, the operations comprising:
receiving tag identifiers reported by cellular mobile devices, each one of the tag identifiers associated with a different tag;
storing the tag identifiers in a network accessible electronic database, the network accessible electronic database storing electronic database associations between the tag identifiers and global positioning system information describing locations reported by the cellular mobile devices;
receiving a search request specifying a tag identifier of the tag identifiers;
querying the network accessible electronic database for the tag identifier specified in the search request;
determining that the network accessible electronic database lacks an entry that electronically associates the tag identifier specified in the search request to the global positioning system information;
retrieving a search policy in response to the network accessible electronic database lacking the entry that electronically associates the tag identifier to the global positioning system information, the search policy defining cellular identifiers for use when searching for the tag identifier;
sending search instructions to the cellular identifiers defined by the search policy, the search instructions instructing corresponding ones of the cellular mobile devices associated with the cellular identifiers to broadcast an interrogation signal specifying the tag identifier specified in the search request;
receiving a response to the search instructions, the response sent from a cellular identifier of the cellular identifiers defined by the search policy, the response confirming reception of a signal sent from a tag associated with the tag identifier, and the response reporting the global positioning system information reported as a location associated with the cellular identifier;
adding the entry to the network accessible electronic database, the entry electronically associating the global positioning system information reported by the response to the cellular identifier and to the tag identifier; and
sending the global positioning system information as a search response to the search request specifying the tag identifier;
wherein the network accessible electronic database stores a centralized repository for the locations reported by the cellular mobile devices.

9. The system of claim 8, wherein the operations further comprise associating the tag identifier with a time associated with the response.

10. The system of claim 8, wherein the operations further comprise time stamping the global positioning system information reported by the response.

11. The system of claim 8, wherein the operations further comprise associating the tag identifier with a profile.

12. The system of claim 8, wherein the operations further comprise associating the tag identifier to a description of an object.

13. The system of claim 8, wherein the operations further comprise retrieving the global positioning system information associated with any of the cellular identifiers defined by the search policy.

14. The system of claim 8, wherein the operations further comprise:
   querying the network accessible electronic database for a description of an object; and
   retrieving the global positioning system information having one of the electronic database associations with the description of the object.

15. A memory device storing executable instructions that when executed cause a processor to perform operations, the operations comprising:
   receiving tag identifiers reported by cellular mobile devices, each one of the tag identifiers associated with a different tag;
   storing the tag identifiers in a network accessible electronic database, the network accessible electronic database storing electronic database associations between the tag identifiers and global positioning system information describing locations reported by the cellular mobile devices;
   receiving a search request specifying a tag identifier of the tag identifiers;
   querying the network accessible electronic database for the tag identifier specified in the search request;
   determining that the network accessible electronic database lacks an entry that electronically associates the tag identifier specified in the search request to the global positioning system information;
   retrieving a search policy in response to the network accessible electronic database lacking the entry that electronically associates the tag identifier to the global positioning system information, the search policy defining cellular identifiers for use when searching for the tag identifier;
   sending search instructions to the cellular identifiers defined by the search policy, the search instructions instructing corresponding ones of the cellular mobile devices associated with the cellular identifiers to broadcast an interrogation signal specifying the tag identifier specified in the search request;
   receiving a response to the search instructions, the response sent from a cellular identifier of the cellular identifiers defined by the search policy, the response confirming reception of a signal sent from a tag associated with the tag identifier, and the response reporting the global positioning system information reported as a location associated with the cellular identifier;
   adding the entry to the network accessible electronic database, the entry electronically associating the global positioning system information reported by the response to the cellular identifier and to the tag identifier; and
   sending the global positioning system information as a search response to the search request specifying the tag identifier;
   wherein the network accessible electronic database stores a centralized repository for the locations reported by the cellular mobile devices.

16. The memory device of claim 15, wherein the operations further comprise associating the tag identifier with a time associated with the response.

17. The memory device of claim 15, wherein the operations further comprise time stamping the global positioning system information reported by the response.

18. The memory device of claim 15, wherein the operations further comprise associating the tag identifier with a profile.

19. The memory device of claim 15, wherein the operations further comprise associating the tag identifier to a description of an object.

20. The memory device of claim 15, wherein the operations further comprise retrieving the global positioning system information associated with any of the cellular identifiers defined by the search policy.

* * * * *